US006479986B1

(12) United States Patent
Steinich et al.

(10) Patent No.: US 6,479,986 B1
(45) Date of Patent: Nov. 12, 2002

(54) TIME/ANALOG CONVERTER FOR A MAGNETOSTRICTIVE POSITION SENSOR

(75) Inventors: Klaus-Manfred Steinich, Poering; Peter Wirth, Eching, both of (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 0 days.

(21) Appl. No.: 09/667,712

(22) Filed: Sep. 22, 2000

(30) Foreign Application Priority Data

May 19, 2000 (DE) .......................... 100 24 716

(51) Int. Cl.⁷ .......................... G01B 7/14; G01D 5/12; G01D 18/00
(52) U.S. Cl. ............. 324/207.13; 324/202; 324/207.24; 324/601; 367/127; 702/94
(58) Field of Search ............................ 324/202, 207.13, 324/207.24, 130, 533, 601, 642; 367/127, 128; 73/1.79, 313, 314, 597; 702/85, 88, 94

(56) References Cited

U.S. PATENT DOCUMENTS 3,978,471 A 8/1976 Kelly
4,461,182 A 7/1984 Jones, Jr. et al.
5,206,586 A * 4/1993 Yauch et al. ............ 324/207.13

FOREIGN PATENT DOCUMENTS

EP 0 514 634 A1 11/1992

OTHER PUBLICATIONS

Copy of Search Report for EP 01 11 1876, Aug. 2001.

* cited by examiner

Primary Examiner—Gerard R. Strecker
(74) Attorney, Agent, or Firm—Crowell & Moring LLP

(57) ABSTRACT

A time/analog converter for adjusting the zero point and amplification of the output characteristic of a sensor includes an integrator whose output is connected to the input of a holding member. A reference voltage and the output voltage of the holding member occur at the input of the integrator. A control means actuates switches connecting the integrator to the holding member and applying the reference voltage and the output voltage to the input of the integrator so that the reference voltage is at the integrator input for a first time interval and the holding member output voltage is at the integrator input for a second time interval. The integrator output voltage is applied to the holding member for a third time interval. A controllable pulse shaper is connected to one of the switches and can close it for a required time interval. A related method is also described.

12 Claims, 6 Drawing Sheets

PULSE DIAGRAM CONFIGURATION OF THE VOLTAGE OVER A PLURALITY OF INTEGRATION/HOLDING CYCLES

PULSE SHAPER CONTROLLED WITH BINARY SIGNALS

PULSE DIAGRAM OF THE PULSE SHAPER CONTROLLED WITH BINARY SIGNALS

PULSE SHAPER CONTROLLED WITH ANALOG VOLTAGE

PULSE DIAGRAM OF THE PULSE SHAPER CONTROLLED BY WAY OF AN ANALOG VOLTAGE

TIME/ANALOG CONVERTER FOR A MAGNETOSTRICTIVE POSITION SENSOR

FIELD OF THE INVENTION

The invention concerns a time/analog converter for the output of a standardised output voltage, for example for a magnetostrictive position sensor. The invention further concerns a method of setting a zero point and amplifying the output characteristic of a sensor such as an ultrasonic position sensor.

BACKGROUND OF THE INVENTION

A magnetostrictive position sensor involves the excitation of electrical current pulses, resulting in the generation of magnetoelastic position pulses which are propagated along a ferromagnetic waveguide. Displacement of a position magnet along the measurement region of the position sensor causes a change in the period of time until the response signal is received. The time interval $t_x$ between excitation of the current pulse (START) and reception of the magnetoelastic position pulse (STOP) at an end of the waveguide is a measurement in respect of the spacing x of a position magnet from that location.

In general an analog voltage is to be provided as the position value at the output of the magnetostrictive position sensor. For that purpose the time interval $t_x$ has to be proportionally converted into a voltage as follows:

$$Uout\ (t_x) = t_x \cdot a \cdot Uref,\ \text{with}\ t_o < t < t_1 \quad (1)$$

In the above equation $t_x$ denotes the signal transit time which is dependent on the position of the position magnet, Uref denotes the voltage of a reference voltage source of adequate accuracy and stability, and a denotes an imaging factor for representation from a time interval to a voltage interval. The design configuration of a magnetostrictive sensor with a detection portion at one end of the waveguide thereof means that it is not possible for the entire length of the waveguide along which the position pulse passes to be used as a measurement range. In addition, for the purposes of adaptation to various measurement ranges, respectively different time interval ranges have to be mapped on to the same output voltage range of preferably between 0V and 10V.

The purpose of a time/analog converter in this context is to prepare for different measurement ranges a standardised output voltage of preferably between 0V and 10V, as is required for further processing by a sequential circuit, in other words, the non-standardised input characteristic which is generally a straight line is to be deformed and shifted in such a way that it entails the standardised output values of 0V and 10V at the respective end positions of the measurement range (which end positions can be denoted by references $t_{x0}$, $t_{x1}$. For that purpose the time intervals of the position sensor, which are formed by the START and STOP signals, must be scaled to the desired standardised output voltage interval, for example as indicated above between 0V and 10V. That is effected in the following form:

$$Uout\ (t_x) = Uref \cdot a \cdot (t_x - b)\ \text{or} \quad (2)$$

$$Uout\ (x) = Uref\ (a' \cdot x - b') \quad (3)$$

The scaling procedure is implemented by means of suitably selected parameters denoted by a meaning amplification or gain and b denoting zero point correction. The time interval $t_x$ formed by the sensor by virtue of the START and STOP pulses is converted into a standardised output voltage of preferably between 0V and Uref or 10V.

It is known for such a measurement conversion operation to be executed by means of integrating time/analog converters referred to often for the sake of brevity as T/A-converters which use integrators with holding members. Such T/A-converters provide that the integration time constant of the integrator or the gain of a downstream-connected amplifier stage is altered by means of trimming potentiometers. That involves the disadvantage that manual adjustment is necessary and thus automation of the scaling procedure is not an option.

SUMMARY OF THE INVENTION

An object of the present invention is to provide a time/analog converter for providing a standardised output voltage, such as for a magnetostrictive position sensor, which can provide for scaling automatically or by programming and which in particular does not require a trimming potentiometer.

Another object of the present invention is to provide a time/analog converter for adjusting zero point and amplifying output characteristic of a sensor such as a magnetostrictive position sensor, which while being of a simplified design configuration affords reliable operational results.

Still a further object of the present invention is to provide a method of setting a zero point and amplifying an output characteristic of a sensor such as an ultrasonic position sensor, which comprises a more rational sequence of operating steps and which affords a reliably attainable procedural result.

In the time/analog converter aspect in accordance with the principles of the present invention the foregoing and other objects are attained by a time/analog converter for adjusting the zero point and amplifying the output characteristic of a sensor such as a magnetostrictive position sensor, comprising an integrator having an output connected by way of a switch to an input of a holding member. The output voltage of the holding member and a reference voltage are applied to the input of the integrator by way of further switching means. Preferably each input voltage of the integrator is applied to a separate switch. The converter further includes a control means such as a microcontroller for actuating the switches in such a way that the reference voltage is conducted to the input of the integrator for a predetermined first time interval and the output voltage of the holding member is conducted to the input of the integrator for a predetermined second time interval, the control means being operable to actuate the first-mentioned switch in such a way that the output voltage of the integrator is applied to the holding member for a predetermined third time interval. A controllable pulse shaper is connected to the switching connection of one of the separate switches of the switching means and can close same for a desired time interval.

In the method aspect the foregoing and other objects are attained by a method of setting a zero point and amplifying the output characteristic of a sensor, for example an ultrasonic position sensor, comprising setting time scaling parameters which can typically be time intervals to a defined basic position, placing the sensor at a first position and measuring the output value thereof. The output value can then be trimmed to a predetermined first value by calibration of a first of the scaling parameters. The sensor is thereupon placed at a second position and the output value thereof measured, followed by trimming of the output value to a predetermined second value by calibration of a second of the scaling parameters.

As will be seen in greater detail from the description hereinafter of preferred embodiments of the invention, the control means actuates the switches in such a fashion that the output voltage of the holding member is conducted for a predetermined time interval identified as T and the reference voltage is conducted for an unknown time interval identified as $t_x-t_{off}$. It is then that the control means switches on a third switch so that the output voltage of the integrator is applied to the input of the holding member for a predetermined third time interval.

For the integrator with an integration time constant $\tau=RC$ over the time interval $t_{on}=[t_{off}; t_x]$ and T, the output voltage of the integrator is:

$$Uout_I = Uout_o - \int_{toff}^{tx}(Uref/\tau)dt - \int_{toff}^{toff+T}(Uout_{to}/\tau)dt, \quad (4)$$

wherein $Uout_0$ and $Uout_1$ denote the integration output voltage before and after a measurement cycle respectively, $t_{off}$ denotes the delay time after the reception of a START-signal, $t_x$ denotes the time interval between the START-signal and the associated STOP-signal and to is the time at which the first switch is closed, which is generally simultaneous with the START-signal. That gives the differential equation with:

$$Uout_{i+1}=Uout_i+Uref\,(t_x-t_{off})/\tau-Uout_i\,T/\tau \quad (5)$$

and for the steady-state condition with:

$$Uout_{i+1}=Uout_i=Uout\,(x) \quad (6)$$

that gives $$Uout(x)=Uref\cdot 1/T(t_x-t_{off}) \quad (7)$$

wherein T is the integration cycle time with which the returned output parameter is involved in the integral. A comparison with equation (4) gives the amplification or gain a' with 1/T and zero point correction b' with $t_{off}/T$.

The length of the time interval $t_{off}$, T is determined by the programmable control means, preferably, as indicated above, a microcontroller. The first scaling parameter $t_{off}$ which determines the offset of the output characteristic is formed by the control means preferably by the delay time of a second delayed start signal START' which is applied to a bistable trigger circuit or multivibrator. The first switch then remains closed for a period $t_{on}$ with $t_{on}=[t_{off}; t_x]$, until a STOP-signal is received.

The second scaling parameter T which determines the gradient of the output characteristic of the sensor is also generated by the control means. For the purposes of trimming the parameter T, it is in principle possible to use any controllable timer which permits adequate fine trimming. In accordance with the present invention however a controllable pulse shaper is used, which is automatically adjustable and which has a fine resolution, with which it is also possible to compensate for tolerances in the sonic transit time of the waveguide.

Adjustment of the time interval $t_{off}$, T is preferably effected under the control of a test unit such as a test field computer which is connected to the control means by way of its programming interface and at which, for given measurement positions of the sensor, trimming of the output signal of the T/A-converter is implemented in the desired manner, by suitably adjusting the scaling parameters $t_{off}$, T.

Parameterisation of the system, that is to say adjustment of zero point and amplification or gain of the output characteristic of the position sensor, can be effected at a plurality of measurement points in the measurement range of the sensor. In a preferred feature however parameterisation is effected only at first and second measurement points of the sensor, in which respect the sensor is preferably moved only once from the first measurement position to the second measurement position.

Further objects, features and advantages of the invention will be apparent from the description hereinafter of preferred embodiments.

DESCRIPTION OF PREFERRED EMBODIMENTS

Figure 1:
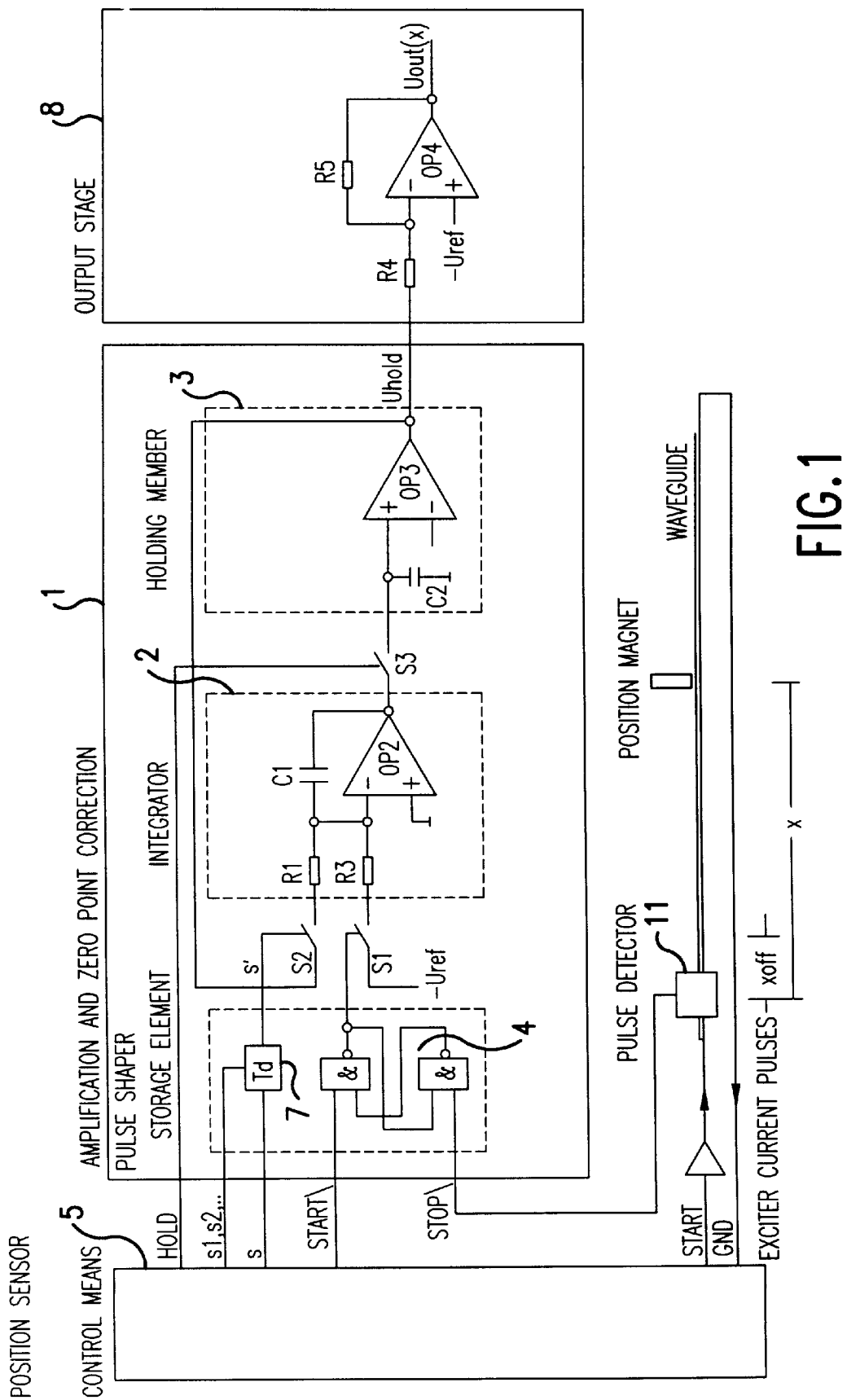
FIG. 1 is a schematic circuit diagram of a T/A-converter according to the invention with output stage connected on the output side thereof.

Before referring to the drawings to describe a time/analog converter for adjustment of the zero point and amplification or gain of the output characteristic of a sensor such as a magnetostrictive position sensor, a method according to the invention for parameterisation purposes will first be described, for first setting the zero point correction and then adjusting the gain or. amplification. It will be appreciated however that the reverse sequence is equally possible.

For this procedure therefore firstly the scaling parameters $t_{off}$, T are put into a defined basic position, for example $t_{off}=1$, T=constant. The sensor is moved into a first measurement position as referred to hereinbefore, preferably a starting position in which $x=x_0$; $t_x=t_{x0}$, and the output voltage at the output of the measurement system is measured. At that measurement point, the output value of the sensor, for the reasons already set forth hereinbefore, is usually not of the desired standardised value such as more particularly 0V, but is at a value which differs therefrom.

That differing value is trimmed by varying the first scaling parameter $t_{off}$ to the desired standardised value of approximately 0V, by a procedure whereby a first switch of the T/A-converter is closed after a delay time $t_{off}$ to a moment in time at which the associated STOP-signal is received, and that delay time is altered stepwise. The trimming procedure is continued until the output value is equal to or at least close to 0V.

Thereupon the position sensor is moved into a second measurement position in which $x=x_1$ and $t_x=t_{x1}$ and the associated output value Uout($x_1$) and Uout($t_{x1}$) is measured. The set position preferably corresponds to the end or limit position of the measurement range of the sensor, at which the output value of the sensor is intended to be at a predetermined second value of for example 10V.

The deviation of the measured value in relation to the value to be set is compensated by trimming of the second scaling parameter which is also a time parameter. That parameter determines how long a second switch of the integrator is closed.

In another form of the method of the invention, firstly the output value of the sensor is measured, preferably at the initial or starting position and the end or limit position of the working range of the sensor, and a scaling factor is calculated from the relationship of the output value range to be set in relation to the measured range. In that respect the scaling factor is as follows:

$$k = U_m(t_{x1})/(Uout(t_{x1}) - Uout(t_{x0})) \tag{8}$$

wherein $U_M(t_{x1})$ is the standardised output voltage which is wanted at the end or limit position of the measurement range after parameterisation has been effected, that output voltage preferably being 10V. The calculated value is preferably set at the end or limit position of the measurement range by varying the first time constant, which entails setting the gain, in which respect the following applies:

$$U(x_{x1}) = U_M(t_{x1})/Uout(t_{x0}) \cdot (1-k) \tag{9}$$

The sensor is then returned to the initial position of the measurement range at which $x = x_0$; $t_x = t_{x0}$, and the second scaling parameter is reduced or increased until the output voltage is zero, this therefore being setting of the zero point.

Instead of effecting setting of the zero point and the gain at the end positions of the measurement range, linearity and sensitivity (1−k) and therewith also the required scaling factor k can be ascertained in a predetermined number of sensor measurement steps which preferably lie only in one direction along the working range of the sensor.

The procedure for setting the time parameters for zero point and gain of the characteristic can also be implemented by means of an automated measurement assembly which thus permits automatic displacement of the sensor, so that this procedure can be carried out without operational intervention. Furthermore self-adjustment of the sensor is possible by means of additional comparators which at the respective various measurement points compare the desired standardised voltage to the measured output voltage.

As the output voltage of the holding member is fed back to the input of the integrator and, by virtue of being applied to the sum point of the integrator, compared to the input value and adjusted, component tolerances and errors in the integrator are not involved in the steady-state condition of the output value. It is therefore possible to use integration capacitors involving high levels of capacitance tolerance, for example 10%, and leakage currents.

Having outlined the operating procedure of the method of the invention, reference will now be directed to FIG. 1 showing an embodiment of a time/analog converter operable to represent the time interval which is supplied by a magnetostrictive position sensor, that is to say, the signal transit times on the magnetostrictive element of the sensor, on a standardised output voltage range. Therefore various time intervals in a range of . . . 0 . . . 1000 µs as an output value are scaled on to the respective same output voltage range of for example 0 . . . 10V. For that purpose, zero point and gain of the output characteristic are set and adjusted by trimming of time parameters $t_{off}$, T with which associated switches diagrammatically indicated at S1, S2 of the T/A-converter 1 are closed and opened respectively.

The T/A-converter 1 shown in FIG. 1 includes an integrator 2 having an input at which switches S1 and S2 are provided. The integrator 2 is of known design configuration and includes an operational amplifier OP2 and an integration capacitor C1. The input of the integrator has an adding node at which the voltages supplied by way of the switches S1 and S2 when in the closed condition are added.

The output of the integrator 2 is connected by way of a switch S3 to the input of a holding member 3. The holding member 3 serves to store the voltage value applied to its input, until the next measurement cycle. The holding member includes an operational amplifier OP3 and a capacitor C2 connected in parallel with the input thereof.

The output voltage of the holding member 3, as indicated by Uhold, is applied to the input of the integrator 2 by way of the switch S2 while a negative reference voltage Uref is applied to the input of the integrator 2 by way of the switch S1.

Connected to the output of the holding member 3 is an output stage 6 having an output at which a standardised output voltage Uout (x) can be taken off.

The switching input of the switch S2 is controlled by a controllable pulse shaper diagrammatically indicated at 7. The pulse shaper 7 has an input at which it receives control signals S, s1, s2, s3 . . . from a control means diagrammatically indicated at 5. The closing duration T of the switch S2 is trimmed with the control signals S, s1, s2, s3 . . . from the control means 5. In that way the gradient of the output characteristic of the sensor is set to the desired standardised range.

The closing and delay times ton and $t_{off}$ respectively of the switch S1 are determined by way of the output of START- and STOP-signals to a bistable trigger circuit or flip-flop diagrammatically indicated at 4 in FIG. 1. In the illustrated embodiment the bistable trigger circuit or flip-flop 4 includes two NAND-gates with feedback, the non-inverting output thereof being connected to the switch S1. A START-signal is fed to the flip-flop 4 by the control means 5 as a set or reset signal respectively, and a STOP-signal is fed to the flip-flop 4 by a pulse detector 11 arranged at an end of the waveguide.

Figure 2:
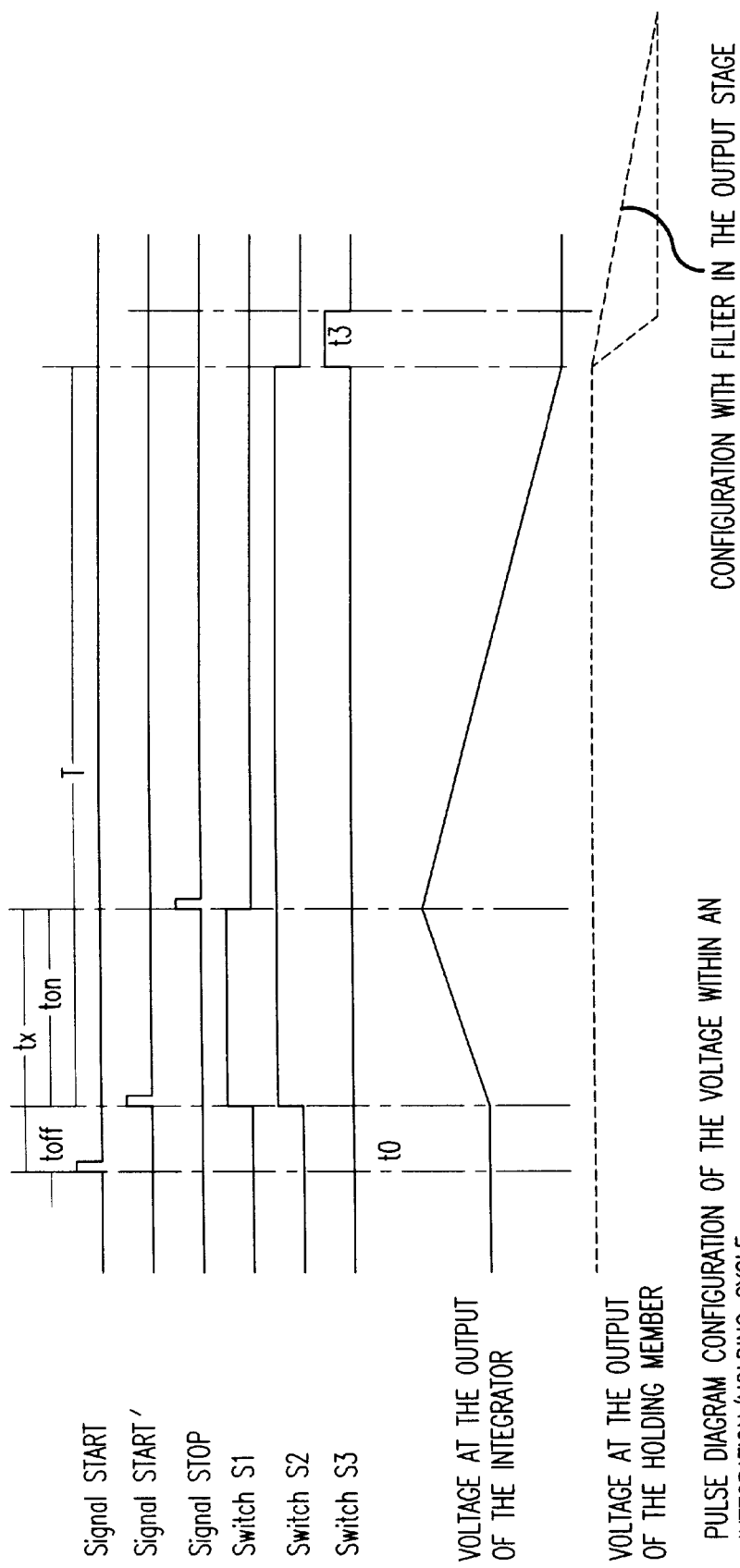
FIG. 2 shows the signal configuration of the scaling parameters and the output voltage of the T/A-converter of the invention as shown in FIG. 1.

Reference will now be made to FIG. 2 showing that the switch S1 is opened during a time interval $t = [t_0, t_{off}]$. After the delay time $t_{off}$ the switch S1 is closed for a period $t_{on}$ until the STOP-signal is received so that the negative reference voltage Uref is passed by way of a resistor R3 to the adding node of the integrator 2.

The switch S2 is closed during the time interval $t = [t_0, T$ so that the output voltage Uhold of the holding member 3 is fed back to the input of the integrator 2 and is conducted therethrough. The length of the time interval T determines in inverse proportion the gradient of the output characteristic of the sensor.

After such a measurement cycle has taken place the voltage value at the output of the integrator 2 is transmitted to the holding member 3 by virtue of the switch S3 closing over a period of time t3. That affords the stepped voltage configuration at the output of the holding member 3, as is shown in broken line in FIG. 2.

If a low pass filter stage which is not shown in the drawing is connected on the output side of the holding member 3, then the cyclic stepped voltage transitions which occur at the sampling rate can be attenuated, in which respect attention may be given to FIG. 2, showing the configuration with a filter in the output stage. Alternatively it is also possible to provide a band rejection filter stage. The filter stage can also be a component part of the output driver stage 6 connected to the output of the holding member 3 in FIG. 1.

It will be noted that the signal configuration shown in FIG. 2 provides that the closing time intervals S1 and S2 partially overlap. This affords the advantage that the integration interval is shorter and thus the integration repetition rate can be increased.

Figure 3:
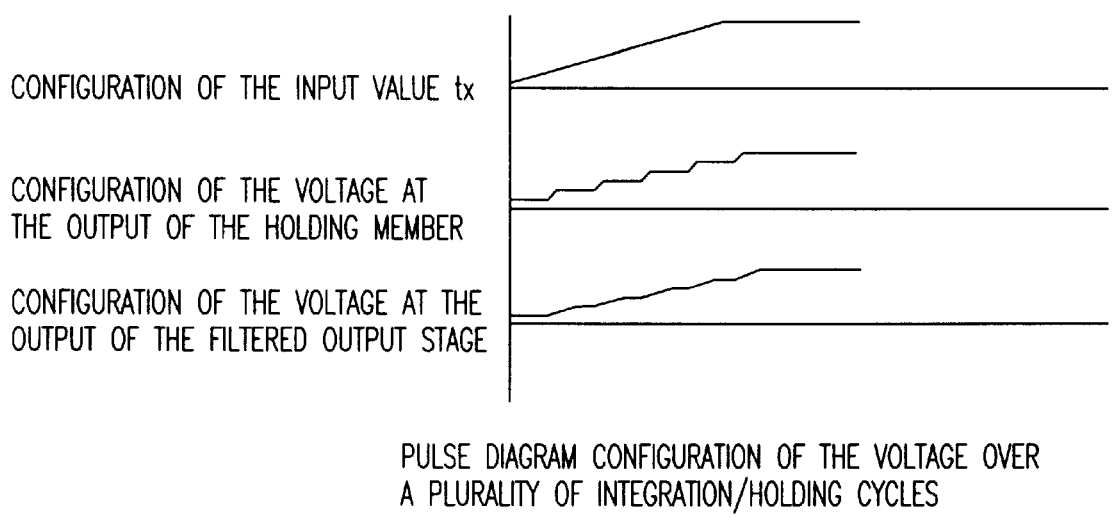
FIG. 3 shows the configuration of the output voltage of the T/A-converter according to the invention with and without filtering of the output stage.

Attention is now directed to FIG. 3 in which the middle part thereof shows the configuration of the voltage at the output of the holding member indicated at 3 in FIG. 1, over a plurality of measurement cycles. If an additional filter stage as just referred to above is included, then that affords the voltage configuration with smoothed step transitions, as shown in the lower part of FIG. 3. The upper part of FIG. 3 shows the variation in the input value $t_x$.

The integration constant $\tau = R1 \cdot C1$ of the integrator, besides the output filtering effect, determines the transient characteristic of the output signal and is generally established to be equal to the respective integration interval T. In a production series of magnetostrictive sensors with different measurement lengths, the integration constant is fixed at the integration interval Tmax of the greatest measurement length which occurs:

$$\tau = R1 \cdot C1_{57\ Tmax}$$

wherein Tmax denotes the integration interval for the greatest measurement length which occurs and $\tau = R1 \cdot C1$ denotes the integration constant of the integrator.

Magnetostrictive sensors with designs involving up to 3 meters in measurement length have an integration interval of a maximum of about 1 ms. The value of T is therefore to be adjusted to a maximum of 1 ms. The integration constant is also fixed with $\tau = R1 \cdot C1 = 1$ ms (R1=1 kOhm, C1=1 $\mu$F). In that case the output signal respectively goes to the limit value in 1 ms after an abrupt change in the input value. For shorter measurement time intervals in the case of sensors involving shorter measurement lengths, $\tau$ generally remains unchanged as a fixed component value, but T is adjusted to the shorter measurement length, for example 330 $\mu$s in the case of a measurement range of 1 m. In that case the output signal, after an abrupt change in the input value, likewise goes in 1 ms within a plurality of integration cycles, in this case three such cycles, to the limit value. If a transient characteristic of optimum rapidity for each measurement length is required, the integration constant $\tau$ can be individually fixed for the respective integration interval T. Conversely, by fixing $\tau > T$, the consequential characteristic of the output signal can be provided with an additional filter effect. The integration constant $\tau$ is always selected to be greater than or equal to T, for reasons of stability.

It will be noted here that in the embodiment shown in FIG. 1 the output stage 6 includes a conventional subtractor with an operational amplifier OP4. The subtractor includes resistors R4 and R5 in a usual arrangement.

Figure 4:
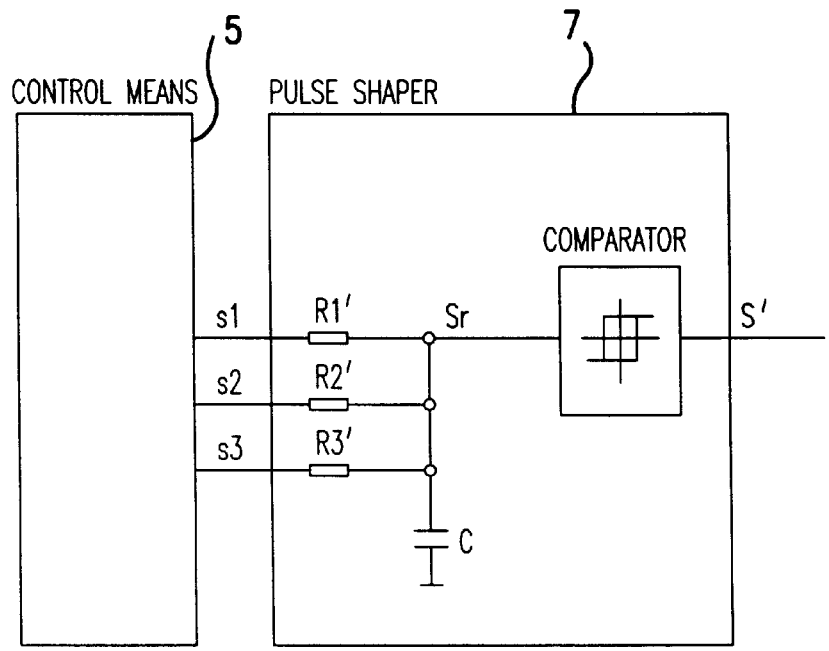
FIG. 4 shows a first embodiment of a controllable pulse shaper.

Reference will now be made to FIG. 4 showing a first embodiment of a controllable pulse shaper 7 according to the invention, for setting the scaling parameter T. The controllable pulse shaper 7 is connected at its input side to the control means 5, from which it receives a plurality of individual signals respectively indicated at s1, s2 and s3. At its output side, the pulse shaper 7 provides a signal S' which closes the switch indicated at S2 in FIG. 1, for the desired period of time T.

The scaling parameter T for setting the gradient of the output characteristic involves essentially two components, more specifically a coarse integration cycle time Tc and a fine integration cycle time Td. The coarse integration cycle time corresponds in a rough approximation to the time interval T which is to be set. That component Tc is preferably formed by the control means by counting of the system clock over a given number of clock periods, with:

$$Tc = Nt_p \qquad (10)$$

wherein N is the number of clock periods of the system clock and $t_p$ is the period of time of the system clock.

The controllable pulse shaper 7 is capable of dividing the period of time of the system clock $t_p$ into further time intervals of shorter duration in order to implement fine trimming. The combination of the coarse and fine time intervals gives the desired overall time interval T with a higher level of time resolution than the system clock, in which respect the following applies:

$$T = Tc + Td \qquad (11)$$

As already referred to above, the coarse time interval is obtained by counting off the system clock by means of a counter while the fine time interval is formed by means of the controllable pulse shaper 7.

The overall time interval T is finally obtained by a procedure whereby the signal S to be trimmed, having an original time length of T, is passed to an RC-member having a plurality of resistors, in the form of a plurality of individual signals s1, s2 and s3 having the common time length T, which are produced by the control means 5 and which can assume the states 'low', 'high' and 'high-resistance' and are switched synchronously. The RC-member in FIG. 4 includes the plurality of resistors R1', R2' and R3' which are connected in parallel relationship and a capacitor C connected in parallel with the input of a comparator. The arrangement may have any number of RC-members.

Figure 5:
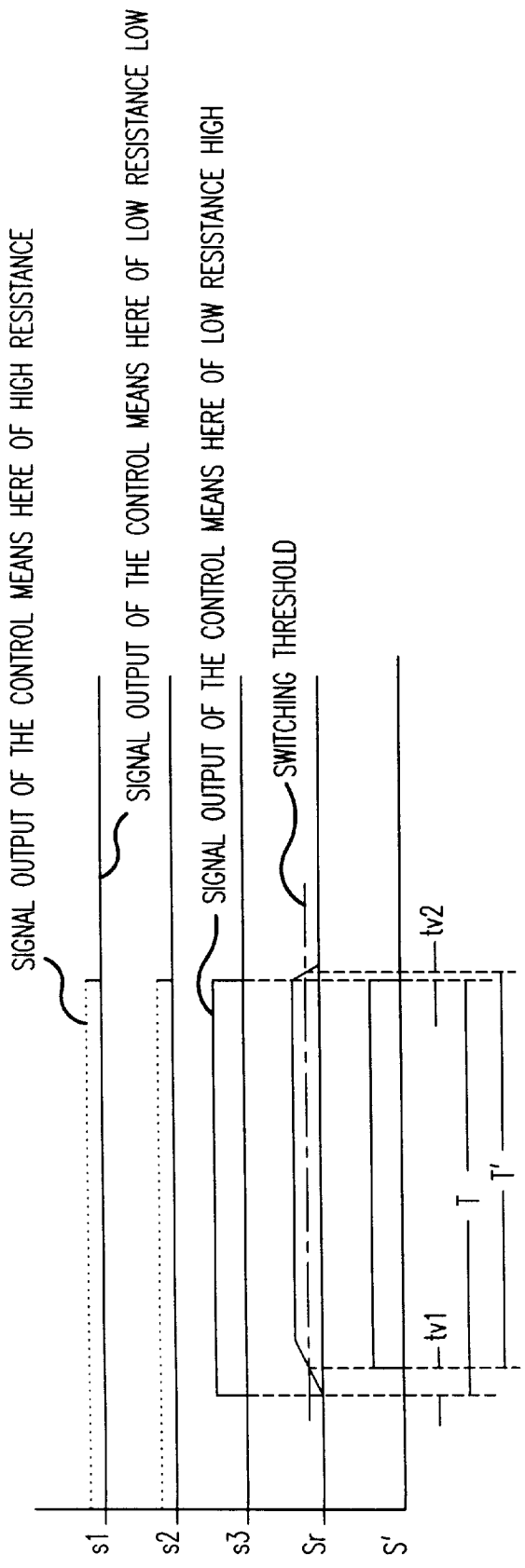
FIG. 5 shows the signal configuration of individual control and output signals of the pulse shaper shown in FIG. 4.

In regard to the example shown in FIG. 5, the individual signals s1 and s2 are at 'low' while the signal s3 is at 'high'. Depending on the switching state of the individual signals s1, s2 and s3 which are applied to the resistors R1', R2' and R3' and which are switched at the same time, a ramp signal indicated at Sr of varying gradient occurs at the capacitor C or at the input of the comparator shown in FIG. 4. When the comparator involves a fixed switching point, an output signal S' is then produced, with differently delayed rising and falling edges and in particular duration T'.

The time delay for the output signal S' can thus be selected to be different by virtue of suitable switching with individual signals s1, s2 and s3.

The values of the resistors are weighted in their relationship with each other in such a way that the combination thereof gives time delay intervals which are linearly graded as far as possible. If all resistors are switched to 'low' or 'high', that affords the shortest time delay for the falling or rising edge respectively. If the resistor with the highest value is switched to 'low' or 'high', while the other resistors are connected to the control means 5 in the 'high-resistance' mode, that gives the greatest time delay for the signal edges.

Finally the signal S' occurs at the output of the controllable pulse shaper 7, with a finely scaled duration of length T'.

That scaling effect only concerns the gain or amplification factor. It is more important to provide for fine trimming of the gain or amplification factor, because of correction of the sonic transit times. If offset is also to be finely trimmed, although generally this is not required, the signal START can also be provided with a corresponding pulse shaper.

Figure 6:
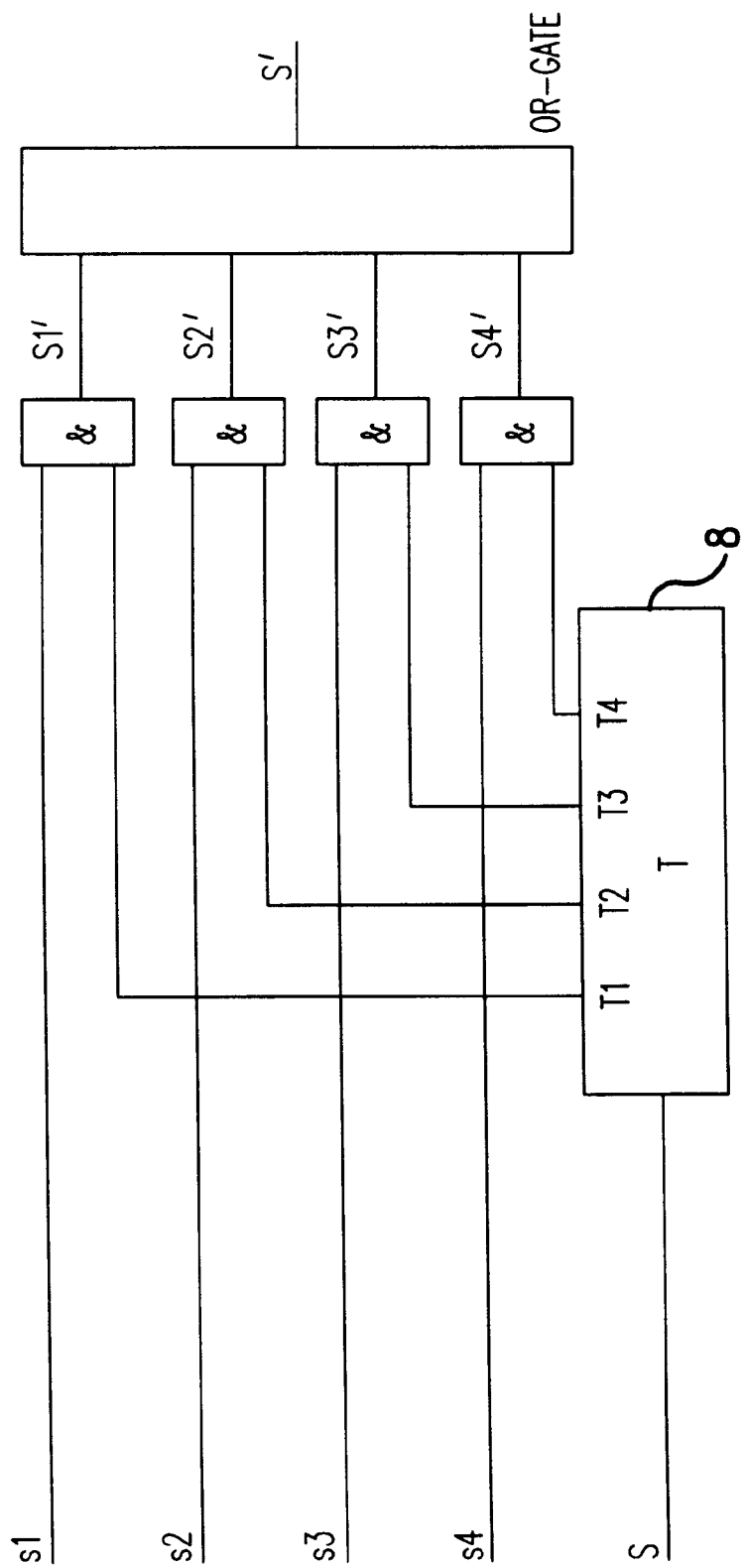
FIG. 6 shows a second embodiment of a controllable pulse shaper according to the invention, with a semiconductor delay circuit.

Reference will now be made to FIG. 6 showing a further embodiment of the controllable pulse shaper 7 according to the invention. In this case the signal S to be trimmed, having an original time length of T, is passed through a delay circuit indicated at 8, having outputs T1, T2, T3 and T4 at which the input signal occurs, delayed by a predetermined period of time, for example 10, 20, 30 and 40 µs. The delayed output signals of the delay circuit 8 are applied to respective logic gates, in the present case each being an AND-gate. The second input of each of the parallel-connected AND-gates receives a respective individual signal indicated at s1, s2, s3 and s4 from the control means which is not shown in FIG. 6 but which is diagrammatically indicated for example in FIGS. 1 and 4. The arrangement may have any number of individual signals s1 through s4.

If for example the individual signal s3 is at 'high' while the signals s1 and s2 are at 'low', the time delay in respect of the signal S is 30 µs. The outputs of the AND-gates are each connected to a respective input of an OR-gate, at the output of which delayed signal S' can be set, with the time duration T. The signals S1', S2', S3' and S4' at the inputs of the OR-gate are thus passed directly to the output.

Figure 7:
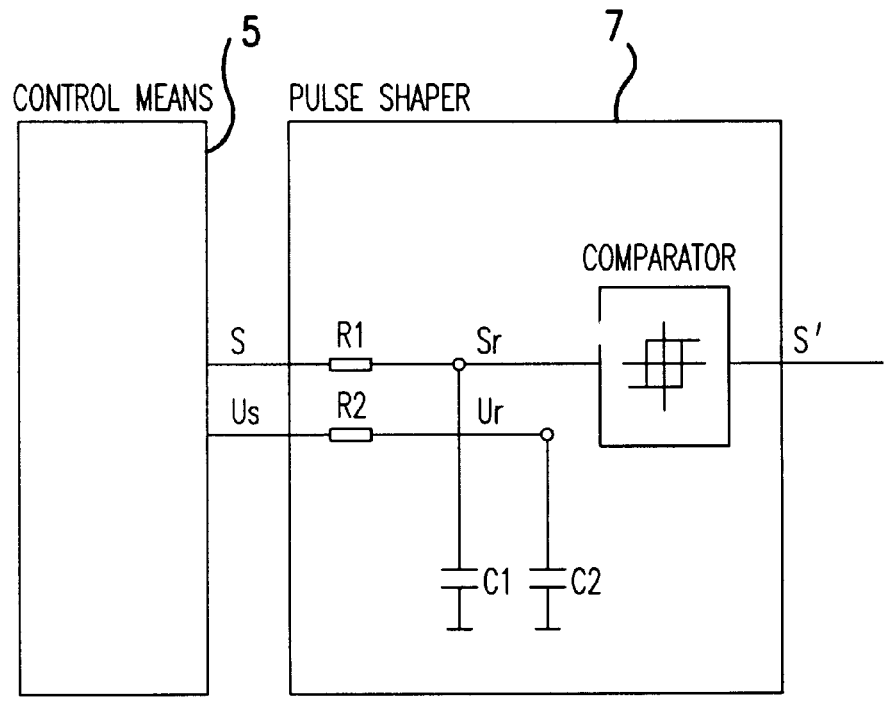
FIG. 7 shows a third embodiment of the controllable pulse shaper according to the invention, with controlled switching threshold.
Figure 8:
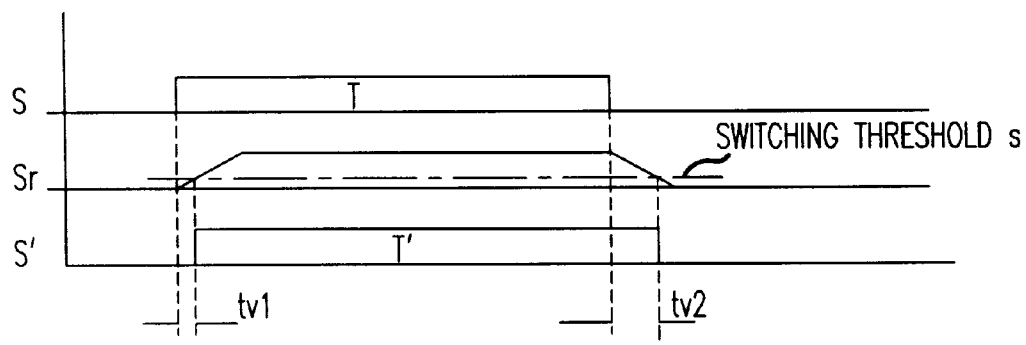
FIG. 8 shows the signal configuration of individual control and output signals of the pulse shaper shown in FIG. 7.

Looking now at FIG. 7, shown therein is a third embodiment of the controllable pulse shaper 7 according to the invention, with a controllable switching threshold. In this case the signal S which is active for a time T is applied to a first RC-member so that, when switching over from the rising and falling switching edges of the signal S, a ramp signal Sr is produced, with correspondingly rising and falling ramps. The signal Sr is applied to an input of a comparator. The time constant for the ramps of the signal Sr from the first RC-member is as great as the period duration of the system clock with which the coarse-resolution signal S is produced by counting down. A variable analog control voltage indicated at Ur in FIG. 7, in respect of which attention is also directed to the configuration in FIG. 8, is applied to the second input of the comparator and thus determines the switching point for the signal Sr. If the analog control voltage Ur is increased, then the period duration T' of the signal S', which is outputted by the comparator, becomes shorter while if it is reduced, the duration T' becomes longer.

The analog control voltage Ur is preferably formed by means of a pulse width-modulated signal indicated at Us in FIG. 7, which is produced by the control means 5 and fed to a second RC-member formed by resistor R2 and capacitor C2, so that the analog control voltage Ur occurs at the output of the second RC-member.

It will be noted that the above-described time/analog converter for adjusting the zero point and amplifying the output characteristic of a sensor can be used more especially in relation to a magnetostrictive position sensor, or for example in relation to an ultrasonic position sensor.

It will be appreciated that the above-described method and converter according to the invention have been set forth solely by way of example and illustration of the principles thereof and that various other modifications and alterations may be made therein without departing from the spirit and scope of the invention.

What is claimed is:

1. A time/analog converter for adjusting a zero point and amplifying an output characteristic of a sensor, comprising:
    a holding member having an input,
    a switch,
    an integrator having an output,
    means connecting the output of the integrator, by way of the switch, to the input of the holding member,
    further switches by which a reference voltage and an output voltage of the holding member are supplied to an input of the integrator,
    a control means adapted to actuate the switches so that the reference voltage is conducted to the input of the integrator for a predetermined first time interval and the output voltage of the holding member is conducted to the input of the integrator for a predetermined second time interval, and also adapted to actuate the switch by way of which the output of the integrator is connected to the input of the holding member to pass the output voltage of the integrator to the holding member for a predetermined third time interval, and
    a controllable pulse shaper connected to a switching connection of one of the further switches and operable to close said one of the further switches for a desired time interval.

2. A converter as set forth in claim 1
wherein the further switches include a first switch to which the reference voltage is applied and a second switch to which the output voltage of the holding member is applied.

3. A converter as set forth in claim 2
wherein the control means is operable to determine a delay time by which the first switch is switched on with a delay.

4. A converter as set forth in claim 2 including
a bistable trigger stage to which the first switch is connected and which is operable to switch the first switch on and off after reception of a start and a stop signal respectively.

5. A converter as set forth in claim 1
wherein the controllable pulse shaper includes an RC-means having a plurality of resistors and a comparator with a fixed switching threshold, having an output at which there is a delayed signal of a duration which is adjustable by selective actuation of the inputs.

6. A converter as set forth in claim 1
wherein the controllable pulse shaper includes a comparator with an adjustable switching threshold, having an output at which there is a delayed signal of a duration which is adjustable by varying the switching threshold.

7. A converter as set forth in claim 6 and further including
an RC-means
wherein the comparator has a control input connected to the control means by way of the RC-means.

8. A converter as set fort in claim 1 including
a plurality of logic gates,
wherein the controllable pulse shaper includes a delay circuit having an input to which the control signal is applied and having outputs which are each connected to a respective logic gate.

9. A converter as set forth in claim 8 including
means for supplying an individual signal to each of the logic gates.

10. A converter as set forth in claim 1
wherein the holding member includes a voltage follower having an input, and a capacitor connected in parallel with said input of the voltage follower.

11. A converter as set forth in claim 1 and further including
an output stage connected on the output side of the holding member, for boosting the output voltage of the holding member, the output stage having an output providing the desired scaled output voltage.

12. A time/analog converter for adjusting a zero point and amplifying an output characteristic of a sensor, comprising:

an integrator having an input and an output, first and second switches each having an input, an output and a switching connection, means connecting the outputs of the switches to the input of the integrator, a holding member having an input and an output, a third switch having an input, an output and a switching connection, means connecting the output of the integrator to the input of the third switch, means connecting the output of the third switch to the input of the holding member, means for feeding an output voltage of the holding member to the input of one of said first and second switches, means for providing a reference voltage to the input of the other of said first and second switches, a control means adapted to actuate the first and second switches so that the reference voltage is passed to the input of the integrator for a first time interval and the output voltage of the holding member is passed to the input of the integrator for a second time interval, and also adapted to actuate the third witch to pass an output voltage of the integrator to the holding member for a third time interval, and a controllable pulse shaper connected to the switching connection of one of the first and second switches and operable to close said one of the first and second switches for a desired time interval.

* * * * *